United States Patent [19]

Arntsen et al.

[11] 4,447,675

[45] May 8, 1984

[54] RING-TRIP DETECTOR

[75] Inventors: Tom D. Arntsen, Convent Station; Rouben Toumani, Randolph, both of N.J.

[73] Assignee: Bell Telephone Laboratories, Incorporated, Murray Hill, N.J.

[21] Appl. No.: 437,804

[22] Filed: Oct. 29, 1982

[51] Int. Cl.³ ............................................. H04M 3/06
[52] U.S. Cl. .............................. 179/84 R; 179/18 HB
[58] Field of Search .............. 179/84 R, 84 A, 18 HB, 179/18 FA; 370/71

[56] References Cited

U.S. PATENT DOCUMENTS

| | | | |
|---|---|---|---|
| 3,746,798 | 7/1973 | Thomas | 179/18 HB |
| 3,829,619 | 8/1974 | Close et al. | 179/18 HB |
| 3,835,258 | 9/1974 | Le Cardonnel | 179/18 HB |
| 3,865,992 | 2/1975 | Bouty et al. | 179/18 HB |
| 4,115,664 | 9/1978 | Laface et al. | 179/84 R |
| 4,234,762 | 11/1980 | Bosik | 179/18 HB |
| 4,262,172 | 4/1981 | Brolin | 179/18 HB |
| 4,356,355 | 10/1982 | Ferrieu et al. | 179/18 HB |

*Primary Examiner*—G. Z. Rubinson
*Assistant Examiner*—James L. Dwyer
*Attorney, Agent, or Firm*—S. M. Gurey

[57] ABSTRACT

A ring-trip detector circuit is disclosed which detects a subscriber off-hook condition in the presence of a ringing signal. The ring-trip detector employs substantially all low-voltage components which enables it to be fabricated using integrated circuit techniques with the resultant cost and space-saving advantages inherent therein. The ringing signal is disabled upon detection of a DC component which is present in the telephone loop only when the subscriber goes off-hook. This circuit detects the DC voltage component across a resistor (20) in series with the ringing source (19) and the telephone loop (12, 13). The voltage across this resistor (20) is converted by resistance networks (23, 24) into two relatively small currents that are fed to low impedance points (25, 26). A difference current is formed therebetween, which is filtered (31, 45) to remove AC components, and compared with a threshold current (29, 46). Ring-trip occurs when the filtered difference current exceeds the threshold.

6 Claims, 2 Drawing Figures

RING-TRIP DETECTOR

BACKGROUND OF THE INVENTION

1. Technical Field

This invention relates to signal detection circuits and, more particularly, to the detection of a DC loop current in a telephone subscriber loop occurring in response to an off-hook condition at the telephone station set in response to a telephone ringing signal.

2. Description of the Prior Art

It has become common to supply subscribers with telephone service over subscriber loop carrier systems. The subscriber loop carrier system is a signal multiplexing system which supplies more than one telephone subscriber channel over a single pair of twisted wires. Such carrier systems are very useful in situations where the cost of providing metallic pairs for each subscriber is prohibitive. They are also useful in situations where it is desirable to defer the laying of new cable until sufficient demand develops, or until known demand levels are ascertained. A final application of subscriber loop carrier systems is to provide temporary service to a particular location, such as, for example, the site of a political or athletic event.

In such carrier systems, it is not possible to transmit the actual ringing signals over the carrier facilities, since ringing signals must be provided for a plurality of different subscribers at the remote end of the carrier system. In this situation, ringing signals are generated at the remote locations and selectively applied to the particular subscribers by control signals sent over the carrier system. It is desirable in such a situation that the ringing signals be provided by means of apparatus which is small in size and economical, and consumes little power, since such apparatus must be located in the remote location.

One of the ancillary features required with such remote ringing supplies is the ability to trip the ringing signal, i.e., terminate the ringing signal, when the called subscriber goes off-hook. When the subscriber telephone station set is placed in the off-hook condition, a direct current path is provided between the tip and ring conductors of the telephone loop. The off-hook condition can be detected from the direct current flow in the telephone loop. Difficulty arises, however, in detecting this relatively small direct current flow in the presence of extremely large alternating current ringing signals.

For purposes of minimizing circuit size and cost and maximizing circuit reliability, it is desirable to detect at the remote terminal the small direct current flow in the telephone loop with circuits that can be fabricated using integrated circuit techniques. Since, however, presently most integrated circuits can process only low-voltage and low-current signals, signals which include as one component the high voltage ringing signals, cannot be economically processed directly by an integrated circuit. Prior art ring-trip detectors, which can be fabricated in part as an integrated circuit, such as disclosed in U.S. Pat. No. 4,262,177 to Brolin, on April 14, 1981, require several high-voltage external and discrete components, such as high-voltage transistors and diodes, and a capacitor in order to process the high-voltage ringing signals on the loop.

The problem, then, is to detect the small direct current flow in the presence of the high-voltage ringing signals by means of low-voltage circuits that can be fabricated using integrated circuit techniques with a minimum number of external discrete components.

SUMMARY OF THE INVENTION

In accordance with the present invention, the small direct current that flows in the presence of the high-voltage alternating current ringing signals is detected by means of low-voltage circuits that directly convert the high ringing voltage developed across a resistor in series with the ringing generator and the telephone loop into two relatively small and substantially proportional currents. The two currents are derived through resistance networks which are each connected to nodes held at near ground potential and, thus, low impedance. By converting the voltages across the series resistor to currents and feeding them to low impedance points, the voltages and currents at these low impedance points can be processed with low-voltage circuits. A difference signal, formed from the two derived currents, and filtered to attenuate AC components, is compared by a threshold comparator. Ring-trip occurs when the filtered difference signal exceeds a threshold level.

Advantageously, the circuit can be fabricated in integrated form with only two external discrete resistors and one discrete external low-voltage capacitor. The resultant extremely compact, inexpensive, and low-powerconsuming circuit implementation makes it well-suited for incorporation in the remote terminal of a subscriber carrier system where it must be duplicated for each subscriber connected to the remote terminal.

DETAILED DESCRIPTION

Figure 1:
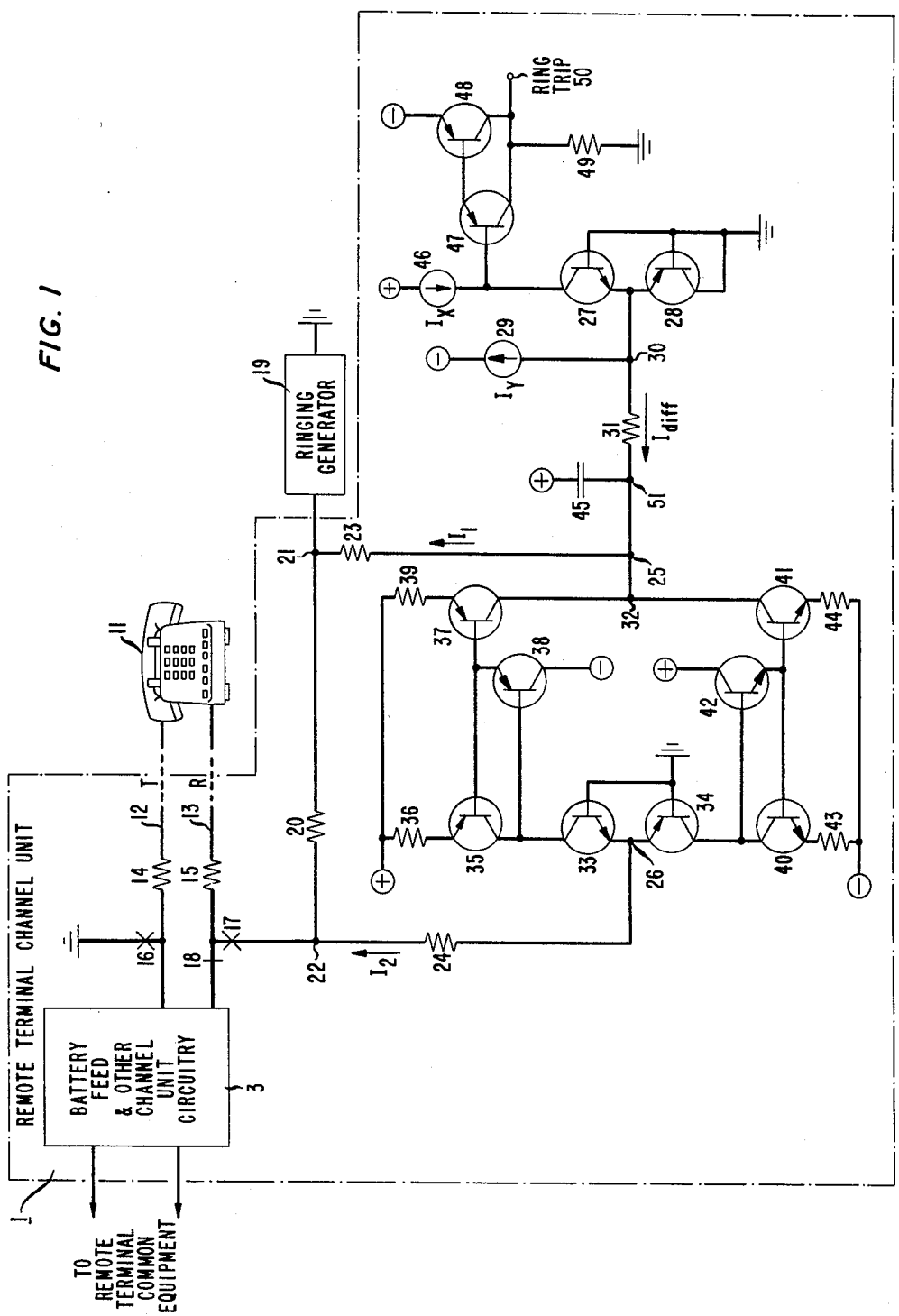
FIG. 1 shows a detailed circuit diagram of a ring-trip detector circuit in accordance with the present invention.

With reference to FIG. 1, there is shown a circuit diagram of a ring-trip detector in accordance with the present invention. The ring-trip detector is incorporated as part of the remote terminal channel unit 1 of a subscriber loop carrier system. The remote terminal channel unit 1 is connected to the remote terminal common equipment which, in turn, is connected by either analog or digital means to a central office. Each subscriber station 11 is connected to a remote terminal channel unit 1 of the subscriber carrier system by two conductors 12 and 13, commonly known as the tip and ring conductors, respectively, through protector resistors 14 and 15. The remote terminal channel unit 1 includes circuits 3 for providing battery feed to the subscriber stations, which detect when a subscriber goes off-hook during the silent interval, and circuits for applying ringing signals to a called station.

When a call is originated that is destined for one of the subscribers served by the carrier system, a control signal is generated by the central office end of the carrier system to identify the particular subscriber to be rung. In response to such a control signal, ringing relays (not shown) close normally open contacts 16 and 17 and open normally closed contact 18. This connects ringing generator 19, which is part of the remote terminal common equipment, through series resistor 20 and over ring conductor 13 to subscriber station 11. An alternating current path is completed through the ringing coils of subscriber station 11, over tip conductor 12 back to the remote terminal channel unit 1, and through contact 16 to ground potential. A capacitor in series with the ringing coils of the subscriber station prevents the flow of direct current over the telephone loop during ringing.

Figure 2:
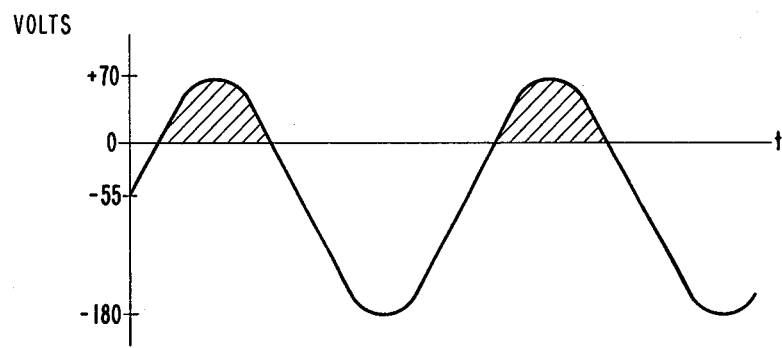
FIG. 2 shows the ringing voltage generated by the ringing generator in FIG. 1.

As illustrated in FIG. 2, the ringing voltage generated by ringing generator 19 is approximately a 100-volt RMS sinusoidal 20-Hz signal biased at about −55 volts. The ringing signal output of ringing generator 19 varies approximately between +70 volts and −180 volts.

When the subscriber goes off-hook in response to the ringing signal, an off-hook switch in subscriber station 11 is closed, thereby inserting a small series resistor, under 450 ohms, across the tip and ring conductors 12 and 13. A direct current component thereupon flows in the telephone loop. This direct current develops a DC voltage over resistor 20. As is described in detail hereinafter, the ring-trip detector of the present invention detects the presence of this DC voltage component across resistor 20 to determine when subscriber station 11 has gone off-hook; and, thereupon, trip the ringing signal.

Briefly, the small DC component, embedded in the high ringing voltage across resistor 20 when the subscriber station 11 is off-hook, is detected, using low-voltage circuitry, by converting the voltages at the two terminal nodes 21 and 22 of resistor 20, into two relatively small currents, $I_1$ and $I_2$, respectively. These currents could typically range in value between a few microamps to several milliamps. $I_1$ and $I_2$ are derived through resistance networks 23 and 24, respectively, which are connected to low impedance points 25 and 26, respectively. By converting the voltages at terminals 21 and 22 of resistor 20 into relatively small currents and feeding them to low impedance points 25 and 26, respectively, the voltage at these low impedance points can be maintained at a small value. The signals at these points $I_1$ and $I_2$ can thus be processed with low-voltage circuits that can be fabricated in integrated form. As will be described, by inverting and repeating $I_2$ and feeding $I_2$ to low impedance node 25, node 25 serves as a summing node for $I_1$ and $I_2$ that forms a difference current between $I_1$ and $I_2$. This difference current is filtered by a low-pass filter to attenuate the AC components and the filtered difference current compared with a threshold current. When the filtered difference current exceeds the threshold current, an output signal is developed for tripping ringing.

The operation of the ring-trip detector is best understood by first describing its off-hook DC behavior. The direct current component of $I_1$, flowing between nodes 25 and 21, is dependent upon the DC voltages at nodes 25 and 21 and resistor 23. Node 25 is kept at near ground potential by NPN transistor 27 and PNP transistor 28, the emitter electrodes of which are interconnected, and the base electrodes of which are connected to ground. A constant current source 29, a standard transistor circuit, connected to the interconnected emitter electrodes of transistors 27 and 28 at node 30, keeps transistor 27 ON. It is readily apparent to one skilled in the art that the DC potential at node 30 is $\pm V_{BE}$ where $V_{BE}$ is the characteristic base-to-emitter voltage of whichever transistor is ON. Typically, $V_{BE}$ has a magnitude of approximately 0.7 volts. The voltage at node 25 is dependent upon the voltage at node 21, resistor 23, resistor 31, the voltage at node 30, and the current from node 32. By using typical circuit values for resistors 23 and 31 of 2 Mohms and 50 Kohms, respectively, and a DC bias voltage of −55 volts at node 21, the DC voltage at node 25 can be calculated to be approximately −1 volt. The DC potential of node 25 is, thus, held close to ground and is, therefore, a low impedance point. The direct current component of $I_1$ is, thus, approximated by the DC voltage at node 21, divided by resistor 23.

Similarly, node 26 is maintained at near ground potential by NPN transistor 33 and PNP transistor 34, the base electrodes of which are connected to ground, and the emitter electrodes of which are interconnected. The potential at node 26 is clamped at the characteristic base-to-emitter voltage, $V_{BE}$, of whichever transistor is biased ON and is approximately ±0.7 volts. The direct current component of $I_2$ through resistor 24 is, thus, approximated by the DC voltage at node 22, divided by resistor 24. The DC voltage at node 22 is between ground and −55 volts, depending upon the resistance of the telephone loop and the resistance of the telephone set. Therefore, the direct current component of $I_2$ flows toward node 22 and has a magnitude less than the direct current component of $I_1$.

The current $I_1$ is substantially proportional to the voltage at node 21 and has a DC component and an AC component. The current $I_2$ is substantially proportional to the voltage at terminal 22 and also has both AC and DC components. By forming a difference signal between $I_1$ and $I_2$, and filtering the AC components, the presence or absence of the DC component of voltage across resistor 20 can be detected.

During that portion of the ringing cycle, when the voltage at node 22 is below zero, $I_2$ flows towards node 22 so that transistor 33 is ON and transistor 34 is OFF. $I_2$ is drawn through transistor 35, the collector of which is connected to the collector of transistor 33, and the emitter of which is connected through resistor 36 to a source of positive potential. Transistors 35, 37, and 38, and resistors 36 and 39 are interconnected in a standard well-known current repeating and polarity-reversing configuration. When transistors 35 and 37 are similar devices, and resistors 36 and 39 are equal, a current flows in the emitter-collector path of transistor 37 equal to the current flowing in the emitter-collector path of transistor 35. Therefore, during the negative portion of the ringing cycle, when $I_2$ flows towards node 22, it is repeated and reversed and simultaneously flows towards node 32. As aforenoted, during this portion of the ringing cycle, transistor 34 is OFF. Therefore, no current flows through transistors 34, 40, or 41. Therefore, only $I_2$ flows into node 32 from transistor 37. Since node 25 is held at a low impedance point, it serves as a summing node. Therefore, since $I_1$ flows away from node 25, towards node 21, during the negative portion of the ringing cycle, and $I_2$ flows towards node 25 from node 32, a difference current $I_{diff}$, equal to $I_1-I_2$, is pulled towards node 25 from node 51.

During the positive portion of the ringing cycle (shaded area in FIG. 2), $I_1$ reverses direction and flows from node 21 towards node 25. Similarly, $I_2$ reverses direction and flows from node 22 towards node 26, turning transistor 34 ON and transistor 33 OFF. Transistors 40, 41, and 42, and resistors 43 and 44, function to repeat and reverse the current through transistor 34 in the standard and identical manner as did transistors 35, 37, and 38, and resistors 36 and 39. Therefore, during the positive portion of the ringing cycle, $I_2$ flows through transistor 41, away from node 32. $I_1$, therefore, flows into summing node 25 and $I_2$ thereout, so that the difference current $I_{diff}$, equal to $I_1-I_2$, flows away from node 25 towards node 51.

Over the entire ringing cycle, therefore, the resultant current at summing node 25 is equal to the difference between $I_1$ and $I_2$, which are each substantially proportional to the voltages at nodes 21 and 22 of resistor 20. Therefore, the difference current $I_{diff}$ is substantially proportional to the voltage across resistor 20.

Resistor 31 and capacitor 45, connected to form a low-pass filter, attenuate the AC component of the difference current $I_{diff}$ so that the current flowing through resistor 31 towards node 25 is essentially the DC component of $I_{diff}$, plus a small AC component.

Constant current source 29 draws a fixed DC current $I_Y$ away from node 30. Therefore, the current drawn through the collector-emitter path of transistor 27 is $I_Y+I_{diff}$. A second constant current source 46, a standard transistor circuit, supplies a fixed current $I_X$ to the collector-emitter path of transistor 27. An additional source of current to the collector-emitter path of transistor 27 is supplied by a pair of transistors 47 and 48 connected as a Darlington pair. The interconnected collector electrodes of transistors 47 and 48 are connected through resistor 49 to ground. The ring-trip output 50 is determined by the voltage across resistor 49.

When the current $I_X$ supplied by current source 46 is less than $I_Y+I_{diff}$ being pulled through transistor 27, base current is drawn through transistor 47 which drives transistor 48 ON. When transistor 48 is ON, current flows in its collector-emitter path, thereby developing a positive voltage across resistor 49. This positive potential at ring-trip output 50 occurs only when the filtered difference current is greater than $I_X-I_Y$, thereby indicating that there is a DC component flowing through resistor 20 and, thus, the telephone loop, and that the subscriber station 11 has gone off-hook. The first occurrence of this potential is latched in a digital circuit and used to trigger the relay (not shown) that controls contacts 16, 17, and 18. Ringing is tripped by opening contacts 16 and 17, and closing contact 18. Ringing generator 19 is thereby disconnected from ring conductor 13, and the tip and ring conductors 12 and 13 are connected directly to the remote terminal channel unit for connection to the called party.

Since $I_2$ is linearly related to the voltage at node 22 of series resistor 20, which, in turn, is dependent upon such variable circuit parameters, such as the resistance of the telephone loop and the resistance of the subscriber station, the reference currents $I_X$ and $I_Y$ are selected so that their difference is small enough to ensure proper off-hook detection on all telephone loops. Similarly, $I_X-I_Y$ must be large enough to prevent false triggering before an actual off-hook condition. Thus, if $I_X-I_Y$ is not sufficiently large, the filtered difference current, plus leakage on the line, could produce signal peaks at node 30 that would result in a positive potential at output 50.

By reducing the high voltages present across the series resistor 20 to equivalent relatively small currents at low impedance points, signal processing of these currents takes place with low-voltage circuits that can be readily fabricated using integrated circuit techniques. The ring-trip detector of the present invention can thus be implemented as part of a larger integrated circuit to minimize size, power consumption, and cost. The number of components external to the integrated circuit needed to implement the ring-trip detector of the present invention is minimal, and in the particular embodiment disclosed hereinabove, only capacitor 45 and resistors 23 and 24 would be external to the integrated circuit.

Although the present invention has been described in connection with a subscriber loop carrier system, it is clear that the principles of this invention can be readily applied to any situation where ring-trip detection is required, or any situation to detect with low-voltage circuitry, a small DC voltage differential between two high-voltage points. In addition, although the present invention has been described as functioning to compare the filtered difference current $I_{diff}$ with a threshold current, it is readily apparent to one skilled in the art that the filtered difference current could be converted to an equivalent voltage which would be compared with a threshold voltage.

The above-described embodiment is illustrative of the application and principles of the invention. Other embodiments may be devised by those skilled in the art without departing from the spirit and scope of the invention.

What is claimed is:

1. A ring-trip detector circuit for the remote terminal of a subscriber loop carrier system comprising
   remotely located ringing signal generating means,
   resistance means having first and second opposed terminal nodes in series with said ringing signal generating means,
   CHARACTERIZED BY
   means for holding first and second low impedance nodes at near ground potential,
   means for directly deriving from the voltage across said resistance means relatively small first and second currents and feeding said currents to said first and second low impedance nodes, respectively,
   means for forming a difference signal from said first and second currents,
   means for filtering AC components from said difference signal, and
   means for generating a ring-trip signal when the filtered difference signal exceeds a predetermined threshold level.

2. The ring-trip detection circuit in accordance with claim 1
   FURTHER CHARACTERIZED IN THAT
   said current deriving means comprises first means connected between said first terminal node and said first low impedance node for directly deriving said first current substantially proportional to the voltage at said first terminal node of said resistance means, and second means connected between said second terminal node and said second low impedance node for directly deriving said second current substantially proportional to the voltage at said second terminal node of said resistance means, and
   said means for forming a difference signal comprises means for repeating and reversing the polarity of said second current, and means for summing said first current and said reversed second current.

3. A ring-trip detection circuit in accordance with claim 2
   FURTHER CHARACTERIZED IN THAT
   said means for repeating and reversing the polarity of said second current comprises first means for repeating and reversing said second current when the flow of said second current is in a first direction, and second means for repeating and reversing said second current when the flow of said second current is in a second direction.

4. A signal detection circuit for detecting a DC signal component in the presence of an AC signal comprising
- resistance means,
- means for holding first and second low impedance nodes at near ground potential,
- means for directly deriving from the voltage across said resistance means relatively small first and second currents and feeding said currents to said first and second low impedance nodes, respectively,
- means for forming a difference signal from said first and second currents,
- means for filtering AC components from said difference signal, and
- means for generating an output signal when the filtered difference signal exceeds a predetermined threshold level.

5. A signal detection circuit in accordance with claim 4 wherein
- said AC signal comprises a ringing signal applied to a telephone loop to operate a telephone ringer in a telephone set connected to said loop, and
- said small DC component comprises the direct loop current that flows when the telephone subscriber goes offhook in response to the ringing signal.

6. A ring-trip detector for determining when a telephone subscriber goes off-hook in response to a ringing signal applied over a telephone loop to a telephone station set comprising
- first resistance means having first and second terminal nodes in series with the telephone loop and the source of said ringing signal,
- means for holding first and second low impedance nodes at near ground potential,
- second resistance means serially connected between said first terminal node and said first low impedance node for developing a relatively small first current therethrough substantially proportional to the voltage at said first terminal node,
- third resistance means serially connected between said second terminal node and said second low impedance node for developing a relatively small second current therethrough substantially proportional to the voltage at said second terminal node,
- means for developing a difference signal from said first and second currents,
- means for filtering AC components from said difference signal, and
- means for generating a ring-trip signal when said difference signal exceeds a predetermined threshold level.

* * * * *